(12) United States Patent
Rezvanian

(10) Patent No.: US 10,201,793 B2
(45) Date of Patent: Feb. 12, 2019

(54) FLUIDIZED BED REACTOR INCLUDING LINER

(71) Applicant: Corner Star Limited, Kowloon (HK)

(72) Inventor: Omid Rezvanian, Chesterfield, MO (US)

(73) Assignee: CORNER STAR LIMITED, Hong Kong (HK)

( * ) Notice: Subject to any disclaimer, the term of this patent is extended or adjusted under 35 U.S.C. 154(b) by 0 days.

(21) Appl. No.: 15/712,524

(22) Filed: Sep. 22, 2017

(65) Prior Publication Data
US 2018/0093239 A1    Apr. 5, 2018

Related U.S. Application Data

(60) Provisional application No. 62/403,915, filed on Oct. 4, 2016.

(51) Int. Cl.
*B01J 8/24* (2006.01)
*B01J 19/02* (2006.01)
*B01J 8/18* (2006.01)

(52) U.S. Cl.
CPC .............. *B01J 8/1872* (2013.01); *B01J 8/24* (2013.01); *B01J 19/02* (2013.01); *B01J 2219/0204* (2013.01); *B01J 2219/0218* (2013.01); *B01J 2219/0227* (2013.01); *B01J 2219/0236* (2013.01)

(58) Field of Classification Search
CPC .............. B01J 8/1872; B01J 8/24; B01J 19/02
USPC ........................................................ 422/139
See application file for complete search history.

(56) References Cited

U.S. PATENT DOCUMENTS

| 3,220,367 | A  | * | 11/1965 | Stein | E04B 5/08 |
|           |    |   |         |       | 110/335   |
| 4,906,441 | A  |   | 3/1990  | Flagella | |
| 9,238,211 | B1 |   | 1/2016  | Osborne et al. | |
| 9,254,470 | B1 |   | 2/2016  | Spangler | |
| 2010/0232940 | A1 | * | 9/2010 | Ammann | F01D 9/04 |
|           |    |   |         |       | 415/173.1 |
| 2014/0038119 | A1 |   | 2/2014 | Goski et al. | |
| 2016/0045880 | A1 |   | 2/2016 | Miller et al. | |

FOREIGN PATENT DOCUMENTS

| DE | 3909340 A1 | * | 11/1989 | ............ C10B 39/02 |
| EP | 130889 A   | * | 1/1985  | ............ E04B 2/12  |

* cited by examiner

*Primary Examiner* — Huy Tram Nguyen
(74) *Attorney, Agent, or Firm* — Armstrong Teasdale LLP (57) ABSTRACT

A fluidized bed reactor includes a reactor core and a stack of liner segments. The stack includes a first liner segment and a second liner segment. The first liner segment includes a first edge having a base surface and an angled surface. The base surface and the angled surface form an obtuse angle. The second liner segment includes a second edge. The first edge and the second edge form a shiplap joint to connect the first liner segment to the second liner segment.

14 Claims, 8 Drawing Sheets

FLUIDIZED BED REACTOR INCLUDING LINER

CROSS-REFERENCE TO RELATED APPLICATION

This application claims the benefit of U.S. Provisional Application No. 62/403,915 filed Oct. 4, 2016, which is incorporated herein by reference in its entirety.

FIELD

This disclosure generally relates to systems and methods including fluidized bed reactors and more particularly to fluidized bed reactors including liners.

BACKGROUND

In some fluidized bed reactor systems, a fluid is passed through a bed of granular material such as a catalyst for growing product particles within a reaction chamber. The flow of fluid causes the bed of granular material to become fluidized in the reaction chamber.

At least some known reactor systems include a liner positioned within the reaction chamber. The liner may be formed from a plurality of liner segments connected together at joints. However, when a load is applied to the liner, the liner segments may have areas of high stress. For example, some liner segments may have areas of high stress at a corner of the liner segments. The areas of high stress can lead to fracture, crack nucleation, and failure of the liner segments. The failure of the liner segments can cause damage to reactor systems, loss of productivity, contamination of multiphase reactions within the reaction chamber, and increased maintenance costs.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF SUMMARY

In one aspect, a fluidized bed reactor includes a reactor core and a stack of liner segments. The stack includes a first liner segment and a second liner segment. The first liner segment includes a first edge having a base surface and an angled surface. The base surface and the angled surface form an obtuse angle. The second liner segment includes a second edge. The first edge and the second edge form a shiplap joint to connect the first liner segment to the second liner segment.

In another aspect, a liner for a fluidized bed reactor includes a first liner segment and a second liner segment. The first liner segment includes a first inner surface, a first outer surface, and a first edge extending between the first inner surface and the first outer surface. The first edge includes an angled surface. The angled surface is angled in relation to the first inner surface and the first outer surface. The second liner segment includes a second inner surface, a second outer surface, and a second edge extending between the second inner surface and the first outer surface. The second edge and the first edge forms a shiplap joint.

In another aspect, a method of assembling a fluidized bed reactor includes positioning a liner in a reaction chamber. The liner includes liner segments. Each of the liner segments includes an edge including an angled surface. The method also includes positioning the liner segments such that the angled surfaces are aligned and connecting the edges of the liner segments such that a shiplap joint is formed between the liner segments.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION

Figure 1:
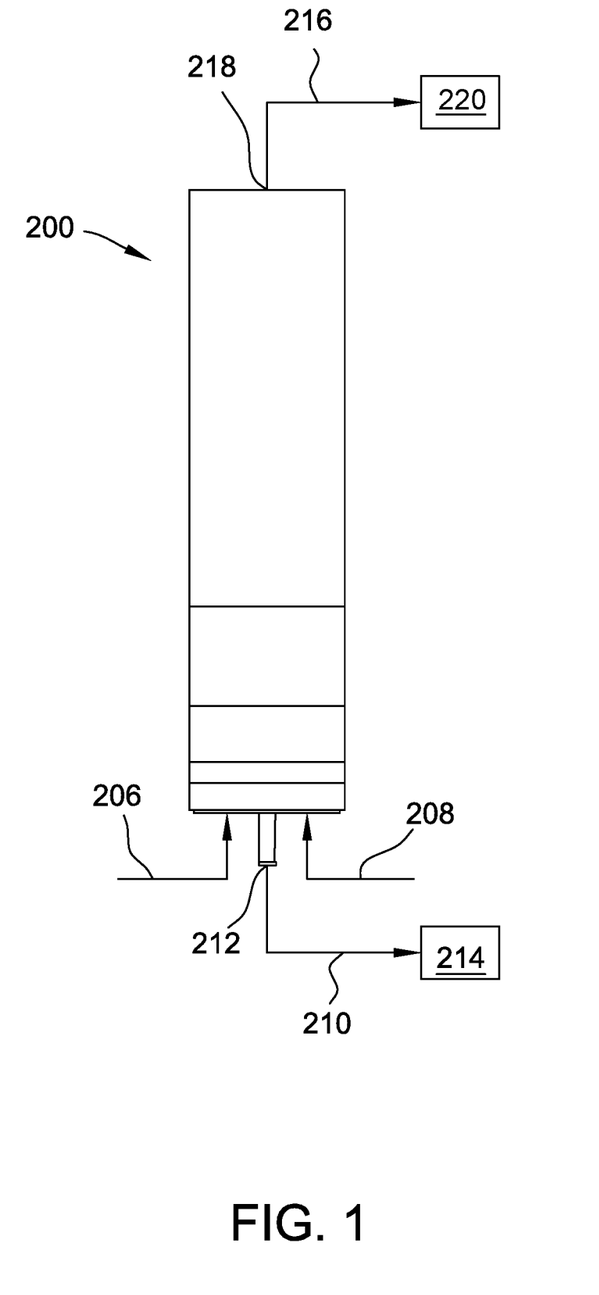
FIG. 1 is a schematic illustration of a fluidized bed reactor.
Figure 2:
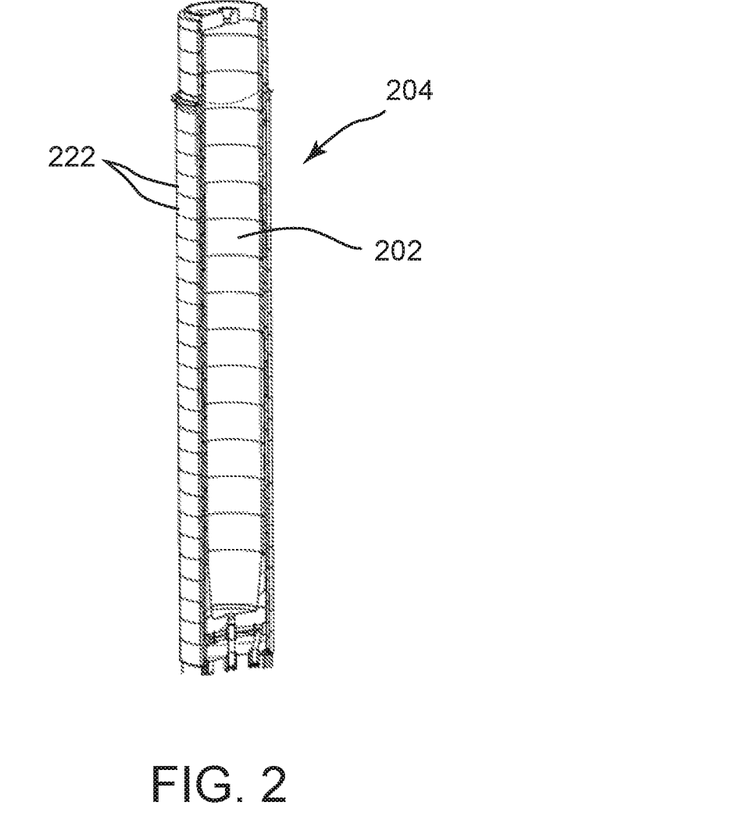
FIG. 2 is a sectional view of a core of the fluidized bed reactor shown in FIG. 1.

Referring to FIG. 1, a fluidized bed reactor is shown schematically and is indicated generally at 200. As shown in FIG. 2, reactor 200 includes a stack 204 that forms a core or reaction chamber 202. Stack 204 may be constructed of any suitable materials. For example, in some embodiments, stack 204 is constructed of coated graphite segments. The graphite segments may be coated with silicon carbide (SiC) using a chemical vapor deposition (CVD) process.

In reference to FIG. 1, during operation of reactor 200, a first gas 206 and a second gas 208 react within reaction chamber 202 to generate product particles 210. Product particles 210 can be withdrawn through a product withdrawal tube 212 and transported to a product storage 214. Spent gas 216 exits reaction chamber 202 through an outlet 218 and can be introduced into further processing units 220.

Figure 3:
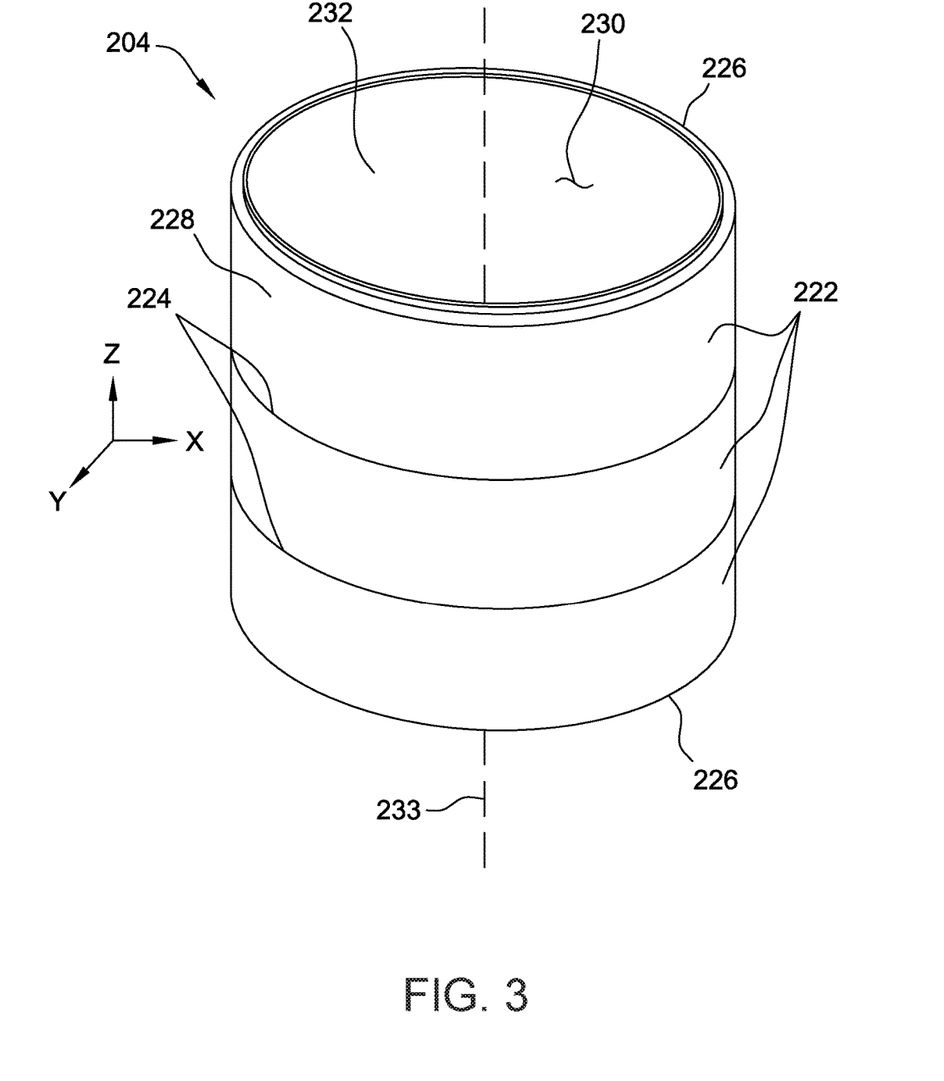
FIG. 3 is an isometric view of a portion of the core shown in FIG. 2.

FIG. 3 is an isometric view of liner segments 222 of stack 204. FIG. 3 includes an X-axis, a Y-axis, and a Z-axis for reference throughout the description. All references to directions are made in reference to the orientation shown in FIG. 3 unless otherwise noted. Liner segments 222 are stacked to form stack 204. Stack 204 may include any number of liner segments 222 arranged in any manner that enables reactor 200 to operate as described. In this embodiment, stack 204 includes three liner segments 222 stacked vertically in the Z-direction.

As will be described in more detail below, liner segments 222 are connected at a plurality of shiplap joints 224. Shiplap joints 224 facilitate liner segments 222 being aligned to form reaction chamber 202.

In the illustrated embodiment, liner segments 222 are substantially cylindrical and connected such that stack 204 forms a cylinder. An axis 233 extends through stack 204 in the Z-direction in the orientation shown in FIG. 3. Throughout this description, references to axial directions refer to directions parallel to axis 233 of stack 204. References to radial directions refer to directions perpendicular to axis 233. In alternative embodiments, liner segments 222 may have any shapes suitable for reactor 200 to operate as described.

Each liner segment 222 includes two opposed ends 226 and a sidewall 228 extending between ends 226. Sidewalls 228 define an interior space 230 for gas 206, 208 to flow through. In this embodiment, ends 226 of liner segments 222 are substantially open such that gas 206, 208 can flow between interior spaces 230 of connected liner segments 222. Liner segments 222 are connected such that shiplap joints 224 extend circumferentially around stack 204. Moreover, liner segments 222 are aligned such that stack 204 forms a substantially continuous reactor surface 232. In alternative embodiments, liner segments 222 are aligned and connected in any manner that enables reactor 200 to operate as described.

Figure 4:
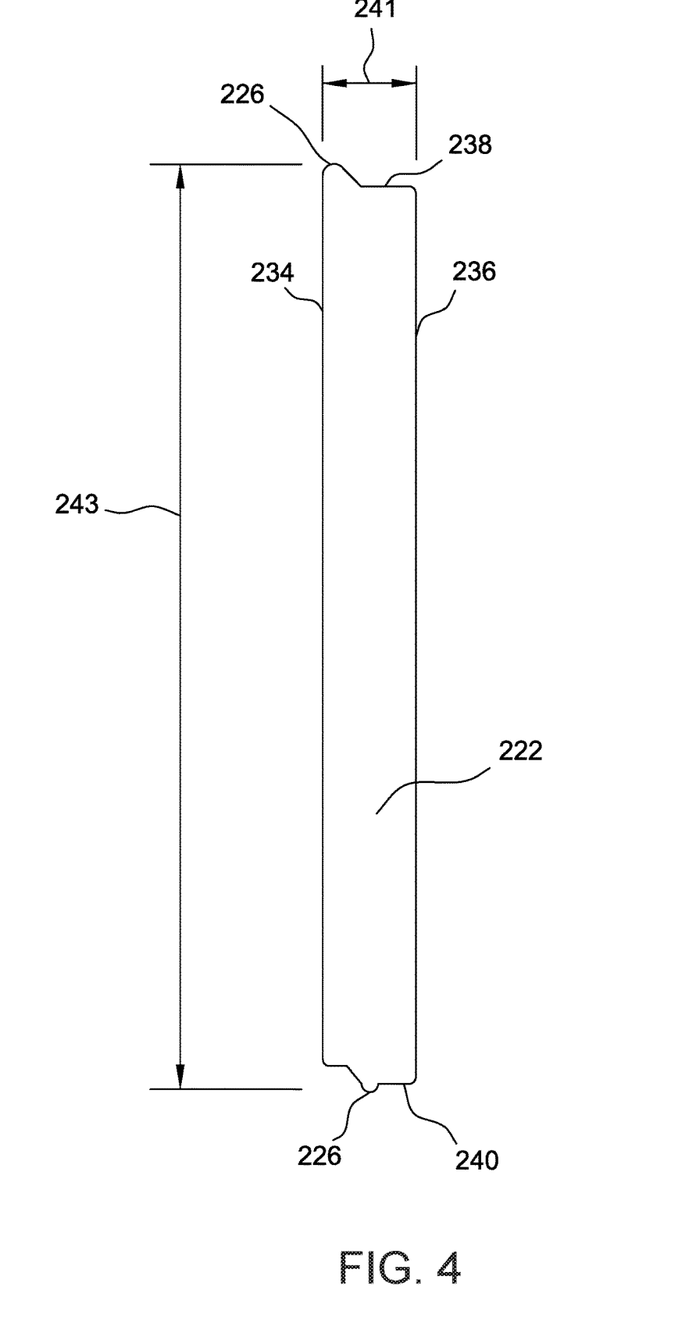
FIG. 4 is a sectional view of a portion of a liner segment shown in FIG. 3.

As shown in FIG. 4, each liner segment 222 has a height 243 defined between ends 226. In some embodiments, liner segments 222 have substantially equal heights 243. In other embodiments, at least some heights 243 of liner segments 222 are different from heights 243 of other liner segments 222. In alternative embodiments, liner segments 222 may have any heights 243 that enable reactor 200 to operate as described.

In this embodiment, each liner segment 222 further includes an inner surface 234, an outer surface 236, a first edge 238, and a second edge 240 opposed to first edge 238. First edge 238 and second edge 240 extend between inner surface 234 and outer surface 236. In addition, a thickness 241 of liner segments 222 is defined between inner surface 234 and outer surface 236. Liner segments 222 may have any thickness 241 that enables reactor 200 to operate as described. For example, thickness 241 may be in a range from about 50 millimeters (mm) to about 90 mm. In this embodiment, thickness is approximately 64 mm.

In reference to FIGS. 3 and 4, first edge 238 and second edge 240 of different liner segments 222 form shiplap joint 224. In particular, first edge 238 of a first liner segment 222 contacts second edge 240 of a second liner segment 222 to form a first shiplap joint 224. In addition, second edge 238 of first liner segment 222 and first edge 238 of a third liner segment 222 form a second shiplap joint 224. The pattern of liner segments 222 having alternating first edges 238 and second edges 240 forming shiplap joints 224 can be repeated for any number of liner segments 222. In some embodiments, some liner segments 222 may be symmetric, e.g., such that edges 238, 240 are mirror images. In further embodiments, some liner segments 222 may have edges contacting other components of reactor 200 such as a top and/or a base.

Figure 5:
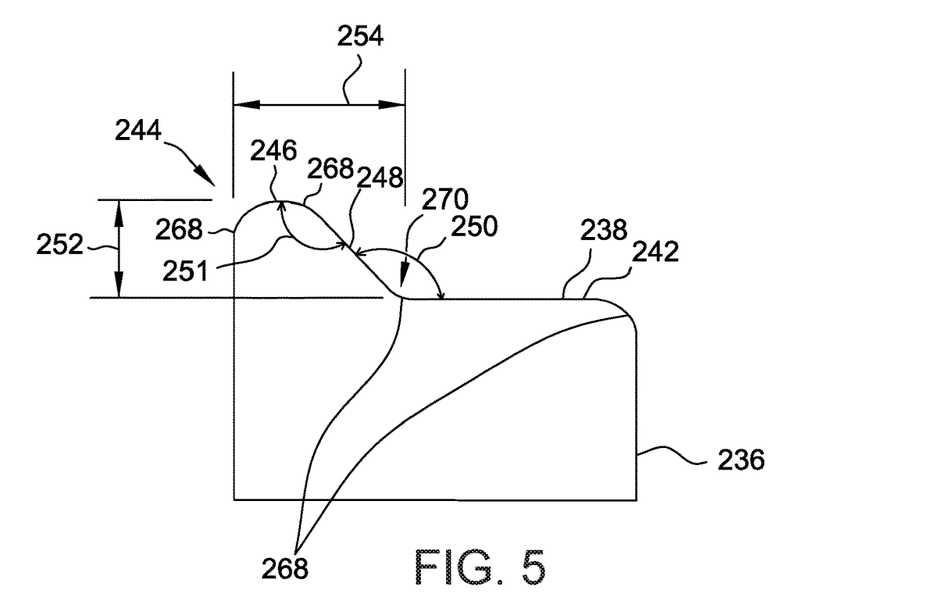
FIG. 5 is an enlarged view of a first edge portion of the liner segment shown in FIG. 4.

As shown in FIG. 5, first edge 238 includes a base surface 242 and an angled step 244. Angled step 244 includes an upper surface 246 and an angled surface 248. Upper surface 246, angled surface 248, and base surface 242 extend between inner surface 234 and outer surface 236. In particular, upper surface 246 extends from inner surface 234 to angled surface 248. Angled surface 248 extends from upper surface 246 to base surface 242. Base surface 242 extends from angled surface 248 to outer surface 236.

In the illustrated embodiment, angled surface 248 extends at an angle between upper surface 246 and base surface 242. In other words, angled surface 248 is slanted relative to upper surface 246 and base surface 242. In addition, base surface 242 and upper surface 246 are substantially orthogonal to inner surface 234 and outer surface 236. In alternative embodiments, first edge 238 has any surfaces that enable reactor 200 to operate as described. For example, in some embodiments, at least one of base surface 242, upper surface 246, and angled surface 248 is omitted.

In this embodiment, angled surface 248 is angled in relation to base surface 242 such that angled surface 248 and base surface 242 form an angle 250. Angle 250 may be any angle that enables reactor 200 to operate as described. For example, angle 250 may be in a range from about 89° to about 136°. In this embodiment, angle 250 is approximately 135°. In addition, angled surface 248 is angled in relation to upper surface 246 such that angled surface 248 and upper surface 246 form an angle 251. Angle 251 may be any angle that enables reactor 200 to operate as described. For example, angle 251 may be in a range from about 89° to about 136°. In this embodiment, angle 251 is approximately 135°. Accordingly, angles 250 and angle 251 are obtuse angles. As used herein, the term "obtuse" means an angle that is greater than 90° and less than 180°.

Angled step 244 extends a distance 252 from base surface 242 in the Z-direction (shown in FIG. 3). Distance 252 may be any distance that enables reactor 200 to operate as described. For example, distance 252 may be in a range from about 10 mm to about 20 mm. In this embodiment, distance 252 is approximately 16 mm. In addition, angled step 244 extends a distance 254 from inner surface 234 in a radial direction. Distance 254 may be any distance that enables reactor 200 to operate as described. For example, distance 254 may be in a range from about 20 mm to about 50 mm. In this embodiment, the distance is approximately 26 mm.

Figure 6:
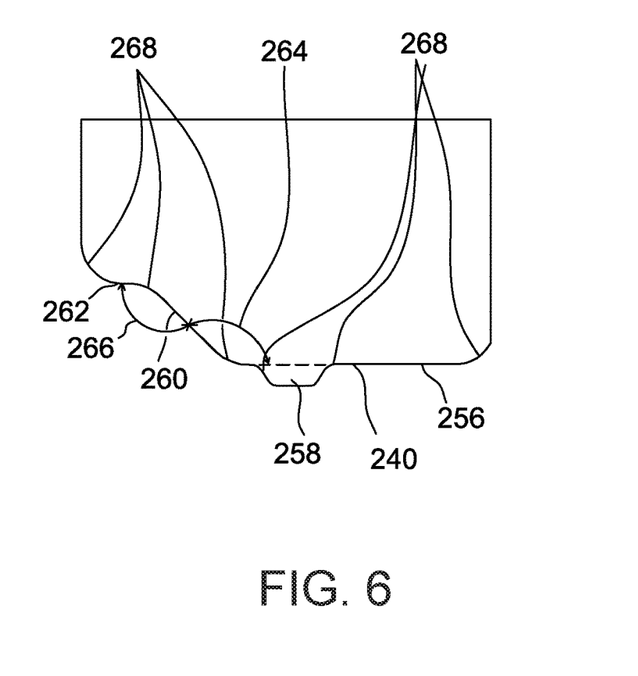
FIG. 6 is an enlarged view of a second edge portion of the liner segment shown in FIG. 4.

In reference to FIG. 6, second edge 240 includes a base surface 256, a projection 258, an angled surface 260, and an upper surface 262. Upper surface 262, angled surface 260, and base surface 256 extend between inner surface 234 and outer surface 236. In particular, upper surface 262 extends from inner surface 234 to angled surface 260. Angled surface 260 extends from upper surface 262 to base surface 256. Base surface 256 extends from angled surface 260 to outer surface 236.

In the illustrated embodiment, angled surface 260 extends at an angle between upper surface 262 and base surface 256. In other words, angled surface 260 is slanted relative to upper surface 262 and base surface 256. Also, upper surface 262 and base surface 256 are substantially orthogonal to inner surface 234 and outer surface 236. Moreover, projection 258 extends from base surface 256 and adjacent angled surface 260. In alternative embodiments, second edge 240 has any surfaces that enable reactor 200 to operate as described. For example, in some embodiments, at least one of base surface 256, projection 258, angled surface 260, and upper surface 262 is omitted.

Angled surface 260 is angled in relation to upper surface 262 such that angled surface 248 and upper surface 262 form an angle 264. The angle 264 may be any angle that enables reactor 200 to operate as described. For example, angle 264 may be in a range from about 89° to about 136°. In this embodiment, angle 264 is approximately 135°. Angled surface 260 is also angled in relation to base surface 256 such that angled surface 260 and base surface 256 form an angle 266. Angle 266 may be any angle that enables reactor 200 to operate as described. For example, angle 266 may be in a range from about 89° to about 136°. In this embodiment, angle 266 is approximately 135°.

Figure 7:
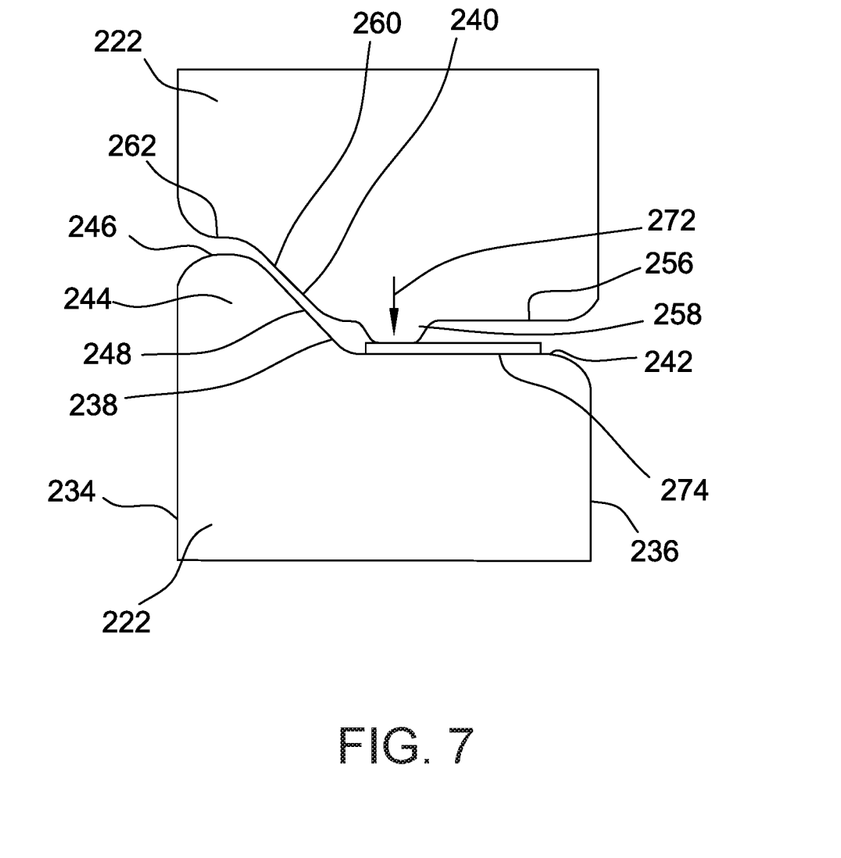
FIG. 7 is an enlarged view of a shiplap joint between liner segments shown in FIG. 2.

As shown in FIG. 7, angled surface 260 is approximately parallel to angled surface 248. Accordingly, angles 264, 266 (shown in FIG. 6) are approximately equal to angles 250, 251 (shown in FIG. 5), respectively. In alternative embodiments, any of angles 250, 251, 264, 266 may be different from each other.

In some embodiments, angles 250, 251, 264, 266 are determined at least in part based on the loading of stack 204 and/or the materials of stack 204. In further embodiments, angles 250, 251, 264, 266 are determined at least in part based on thickness 241 of stack 204. In alternative embodiments, angles 250, 251, 264, 266 are determined based on any factors that enable stack 204 to function as described herein.

First edge 238 and second edge 240 facilitate alignment of liner segments 222. For example, angled surface 248 of first edge 238 and angled surface 260 of second edge 240 align when liner segments 222 are aligned. As a result, angled surface 248 and angled surface 260 may contact each other and guide liner segments 222 into proper alignment. Moreover, angled surface 248 and angled surface 260 may contact each other to inhibit liner segments 222 moving out of alignment.

In reference to FIGS. 5 and 6, first edge 238 and second edge 240 include transitions 268. Transitions 268 may be any transitions that enables reactor 200 to operate as described. For example, at least one transition 268 may have a radius 270 in a range from about 1.4 millimeters (mm) to about 3.1 mm. In this embodiment, a transition 268 between angled surface 248 and base surface 242 has radius 270 of approximately 3 mm. In alternative embodiments, transitions 268 may include rounds and/or bevels. In further embodiments, at least some transitions 268 are omitted.

In this embodiment, as shown in FIG. 7, a gasket 274 extends between first edge 238 and second edge 240 to seal shiplap joint 224. Gasket 274 contacts projection 258 and base surface 242. In alternative embodiments, shiplap joint 224 is sealed in any manner that enables reactor 200 to operate as described. For example, in some embodiments, a sealant is injected at least partially between first edge 238 and second edge 240. In further embodiments, a seal is positioned on inner surface 234 to at least partially cover shiplap joint 224.

Also, in this embodiment, projection 258 contacts base surface 242 to transfer an axial load 272 from an upper liner segment 222 to a lower liner segment 222 when liner segments 222 are connected to form shiplap joint 224. In particular, upper liner segment 222 bears on lower liner segment 222 through projection 258 such that axial load 272 from upper liner segment 222 is concentrated in projection 258 and transferred through gasket 274 to lower liner segment 222. In alternative embodiments, axial load 272 is transferred through liner segments 222 in any manner that enables reactor 200 to operate as described. For example, in some embodiments, at least one of base surface 256, angled surface 260, and upper surface 262 of second edge 240 contacts first edge 238 and transfers a portion of axial load 272.

Moreover, in this embodiment, projection 258 is positioned to transfer axial load 272 to a predetermined location on first edge 238. In particular, axial load 272 is transferred to first edge 238 at a location adjacent angled step 244. As a result, axial load 272 is transferred through first edge 238 and second edge 240 at locations spaced from inner surface 234 and outer surface 236 to reduce the risk of fracture and failure of liner segment 222 adjacent inner surface 234 and outer surface 236.

Figure 8:
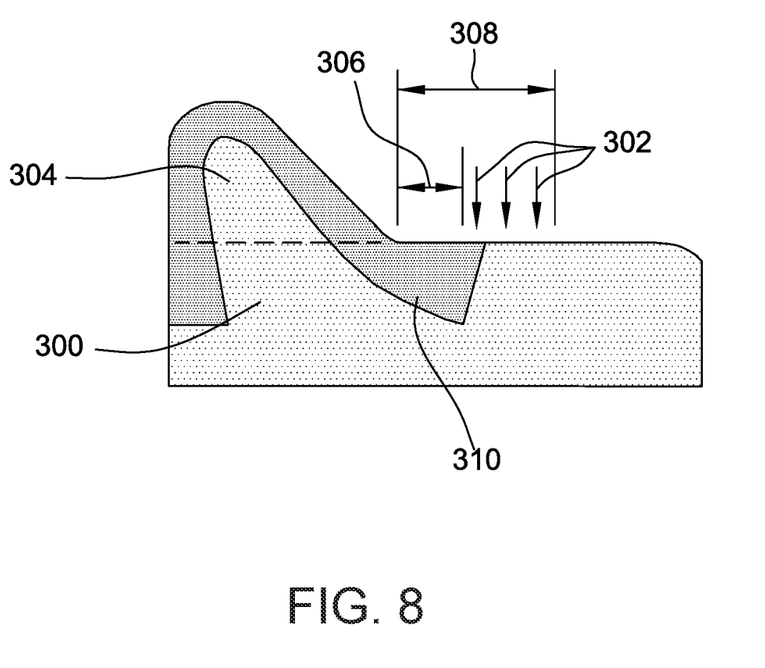
FIG. 8 is model of a portion of a liner segment under axial load.

FIG. 8 illustrates a detailed finite element model of a liner segment 300 under an axial load 302. In addition to axial load 302, liner segment 300 is under a differential pressure load. Axial load 302 is approximately 25.8 megapascals (Mpa). The differential pressure load is approximately 0.25 Mpa. Liner segment 300 is approximately 63.5 mm thick and is constructed of graphite. Liner segment 300 includes an angled step 304. Axial load 302 is located a minimum distance 306 from angled step 304 of approximately 5.4 mm and a maximum distance 308 of approximately 12.7 mm. Due at least in part to angled step 304, a stress region 310 is distributed throughout liner segment 300. In particular, stress region 310 extends substantially the entire span of angled step 304. Accordingly, there are no localized stress regions on liner segment 300. Additionally, liner segment 300 has a negligible risk of fracture and failure due to a maximum stress in a localized stress region.

Figure 9:
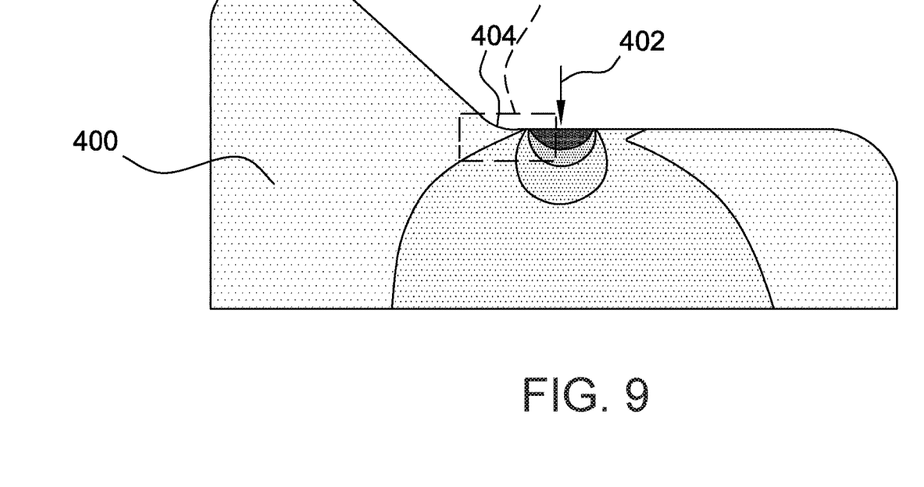
FIG. 9 is a stress contour map of a portion of a liner segment under axial load.
Figure 10:
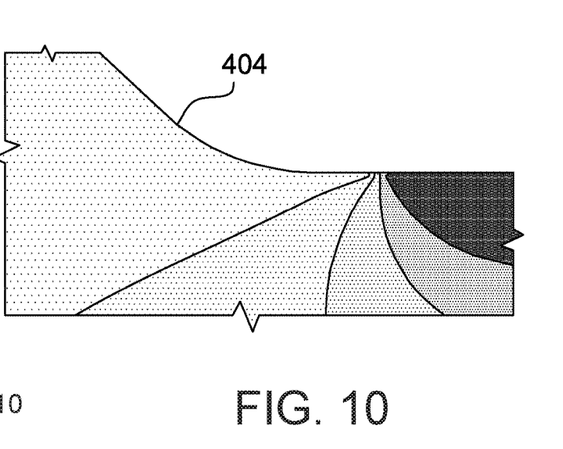
FIG. 10 is an enlarged view of a portion of the stress contour map shown in FIG. 9.

FIG. 9 is a stress contour map of a portion of a liner segment 400 under an axial load 402 and a differential pressure load. FIG. 10 is an enlarged view of a portion of the stress contour map. Liner segment 400 has a stress zone 404 that is significantly reduced in comparison to local high stress zones of other liner segments under similar loading and with different angles. Specifically, stress in liner segment 400 is reduced by approximately 48% in comparison to stress in other liner segments with angles equal to 90°.

The fluidized bed reactor systems and methods described above achieve superior results compared to some known systems and methods. The systems include slanted shiplaps that reduce the localized stress in a liner of the reactor systems. As a result, the risk of fracture and failure of the liner is reduced and the lifecycle of the liner is increased. The systems also have reduced maintenance costs and decreased system downtime.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the invention, it is intended that all matter contained in the above description and shown in the accompanying drawings shall be interpreted as illustrative and not in a limiting sense.

What is claimed is:
1. A fluidized bed reactor comprising:
   a reactor core; and
   a stack of liner segments comprising:
      a first liner segment including a first edge having a base surface and an angled surface, the base surface and the angled surface forming an obtuse angle; and
      a second liner segment including a second edge, the first edge of the first liner segment and the second edge of the second liner segment forming a shiplap joint to connect the first liner segment to the second liner segment.

2. The fluidized bed reactor of claim 1, wherein the second edge includes an angled surface aligned with the angled surface of the first edge when the first edge and the second edge form the shiplap joint.

3. The fluidized bed reactor of claim 1 wherein the second edge contacts the first edge adjacent the angled surface such that an axial load is transferred through the shiplap joint adjacent the angled surface.

4. The fluidized bed reactor of claim 1 wherein the first liner segment and the second liner segment each have a cylindrical shape and the shiplap joint extends circumferentially between the first liner segment and the second liner segment.

5. The fluidized bed reactor of claim 1 further comprising a third liner segment, and wherein a second shiplap joint is formed between the third liner segment and the second liner segment.

6. The fluidized bed reactor of claim 1, wherein the first liner segment further includes an inner surface and an outer surface, and the first edge further including an upper surface extending from the inner surface to the angled surface, the angled surface extending from the upper surface to the base surface and the base surface extending from the angled surface to the outer surface.

7. The fluidized bed reactor of claim 6 wherein the angled surface is angled in relation to the inner surface and the outer surface.

8. The fluidized bed reactor of claim 1 wherein the second edge further includes a projection that facilitates load transfer to the first edge.

9. A liner for a fluidized bed reactor, the liner comprising:
a first liner segment including a first inner surface, a first outer surface, and a first edge extending between the first inner surface and the first outer surface, the first edge including an angled surface, the angled surface being angled in relation to the first inner surface and the first outer surface; and
a second liner segment including a second inner surface, a second outer surface, and a second edge extending between the second inner surface and the first outer surface, the second edge and the first edge forming a shiplap joint.

10. The liner of claim 9, wherein the first edge further includes comprises an upper surface extending adjacent the angled surface.

11. The liner of claim 9, wherein the second liner segment is positioned above the first liner segment such that the first inner surface and the second inner surface are aligned in a substantially vertical direction, the angled surface being angled in relation to the vertical direction.

12. The liner of claim 11, wherein the first edge further includes a first base surface extending adjacent the angled surface, the first base surface extending substantially perpendicular to the first inner surface.

13. The liner of claim 12, wherein the second edge further includes a second base surface, a projection, and an angled surface that aligns with the angled surface of the first edge, the projection extending from the second base surface adjacent the second angled surface.

14. The liner of claim 13, wherein the projection contacts the first edge such that an axial load is transferred through the projection.

* * * * *